[11] 3,633,212

[72] Inventor Guy F. Hartary
484 Ra Q. Baxter Warner and
[21] Appl. No. 80,866 Howard J. Murray, Jr.
[22] Filed Oct. 15, 1970
[45] Patented Jan. 4, 1972

[54] SYSTEM FOR DETERMINING THE ORIENTATION OF AN OBJECT BY EMPLOYING PLANE-POLARIZED LIGHT
9 Claims, 8 Drawing Figs.

[52] U.S. Cl........................................................ 346/107,
350/153, 356/118
[51] Int. Cl........................................................ G01p 13/00
[50] Field of Search............................................ 346/107,
38, 2; 356/114, 118, 119, 138; 352/39, 131, 132;
350/153, 159; 250/225, 231 SE; 95/1.1

[56] References Cited
UNITED STATES PATENTS
3,269,254  8/1966  Cooper et al. ................. 356/138 X
3,306,159  2/1967  Beall et al. ..................... 356/114 X ABSTRACT: A system for ascertaining the positional characteristics of a moving object from a given viewing point. In one embodiment, the invention is employed to determine the attitude of a missile subsequent to its being launched from an aircraft. A plurality of specially oriented light-polarizing reflectors are attached to the missile surface, and observed by a viewing camera on the aircraft. A source of plane-polarized light on the aircraft illuminates the reflectors on the missile. The attitude of the latter with respect to this source determines the amount of illumination picked up by the camera from each reflector. Such data is then coordinated to yield the positional information desired. In another embodiment, the invention time-correlates a plurality of viewing cameras by causing a time-coded reflection of light to be visible on the missile regardless of view angle.

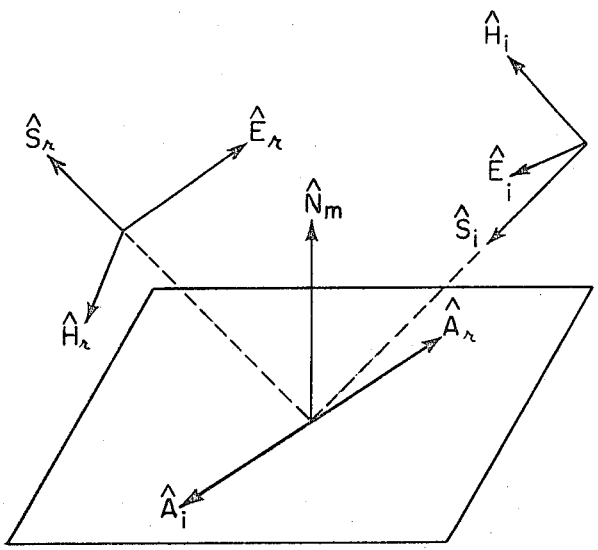
Fig.1
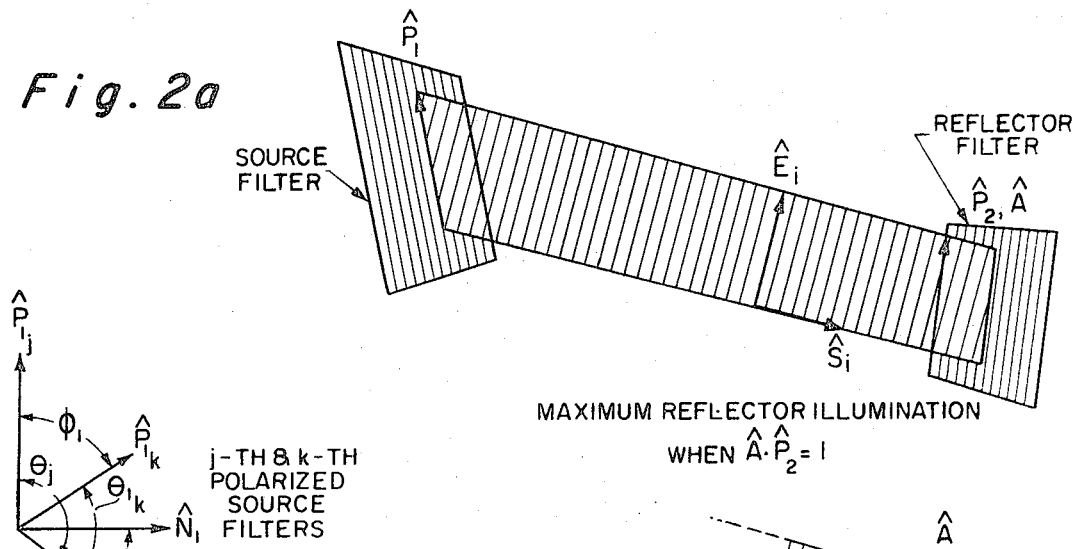
Fig.2a
Fig.2b
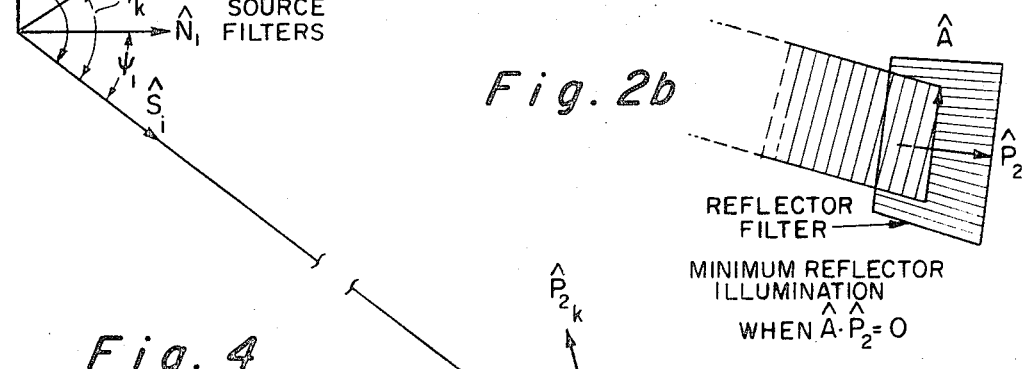
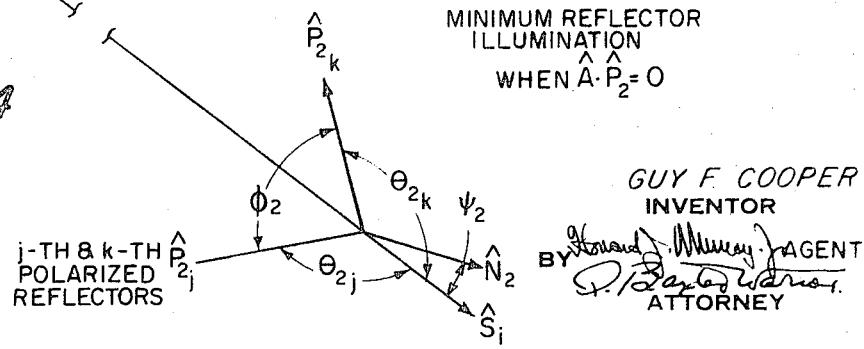
Fig.4
GUY F. COOPER
INVENTOR

PATENTED JAN 4 1972

LEGEND
M – SEMI-MIRRORS
R – RED FILTER
B – BLUE FILTER
G – GREEN FILTER

SYSTEM FOR DETERMINING THE ORIENTATION OF AN OBJECT BY EMPLOYING PLANE-POLARIZED LIGHT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

At the present time, devices such as accelerometers and extensometers are frequently utilized to instrument kinematic events. In addition, moving-picture cameras find particular application for such operations as the launch of a missile from an aircraft. In such cases, efforts are made to place the respective camera centerlines perpendicular to the plane of motion (as with cameras in chase planes directly abeam of the missile-launching aircraft). However, onboard launch-viewing cameras rarely have good view angles, so that several are required to triangulate the missile's position. Kinematic data is extracted from these films, using semiautomatic viewers with crosshairs manually positioned on a tracking point. The operator then records the crosshair positions in arbitrary units (often punched on cards after being scaled). If difficult angles require trigonometric correction or triangulation to be made, the data is fed to a computer that generates the true kinematic trajectory of the missile in coordinate systems related to the launching aircraft. This entire data system is subject to limitations in "resolving power" because of camera misalignment, calibration tolerances and operator error. Time correlation may be achieved by a coded signal on the border of each film from some central secondary time standard. Alternatively, the frame rates are calibrated and the event itself (or possibly several flash bulbs) can serve to time-synchronize the camera films. Cameras without provision for a coded time track on the film border often experience changes in frame speed due to environmental conditions. Greater expense and need for telemetering a time signal follow from the use of a time code on each film.

SUMMARY OF THE INVENTION

The purpose of the present disclosure is to supplement the present moving-picture instrumentation of kinematic events insofar as the derivation of time and position data is concerned by employing one or more sources of polarized light and a plurality of unique reflecting members so as to a. Correlate each of several viewing camera films with an optical time signal on the moving object independent of: differing camera view stations, rotational attitude of the object, differing and unsteady film speeds, and intensive flow fields (as with missiles launched from aircraft);

b. Provide each of several viewing cameras with an optical signal on the moving object which indicates that object's rotational position independent of differing camera view stations and intensive flow fields. No modification whatsoever is required to conventional high-speed cameras, films, or camera-operating techniques.

STATEMENT OF THE OBJECTS OF THE INVENTION

One object of the present invention, therefore, is to provide means for ascertaining the orientation of a moving object by employing plane-polarized light.

Another object of the invention is to determine the attitude of a missile following its launch from an aircraft.

A further object of the invention is to provide each of a plurality of cameras viewing a moving object with an optical indication on such object which indicates the latter's attitude independently of differing view stations and flow fields.

A still further object of the invention is to achieve the foregoing results regardless of variations in camera film speed.

Another object of the invention is to supplement, but not interfere with, present photogrammetric techniques of determining body kinematics wherein several points on the body are tracked.

BRIEF DESCRIPTION OF THE DRAWINGS

Other objects, advantages and novel features of the invention will become apparent from the following detailed description of the invention when considered in conjunction with the accompanying drawings wherein:

FIG. 1 is a vector diagram useful in understanding the mathematical model upon which the present invention is based;

FIGS. 2a and b illustrate the relative orientations of the source and reflector filters of the invention and the plane of polarization of the light beam for maximum and minimum reflector illumination, respectively;

FIG. 4 is a vector diagram of a particular relationship of the source and reflector filters of the present invention;

DESCRIPTION OF THE PREFERRED EMBODIMENT

Figure 3:
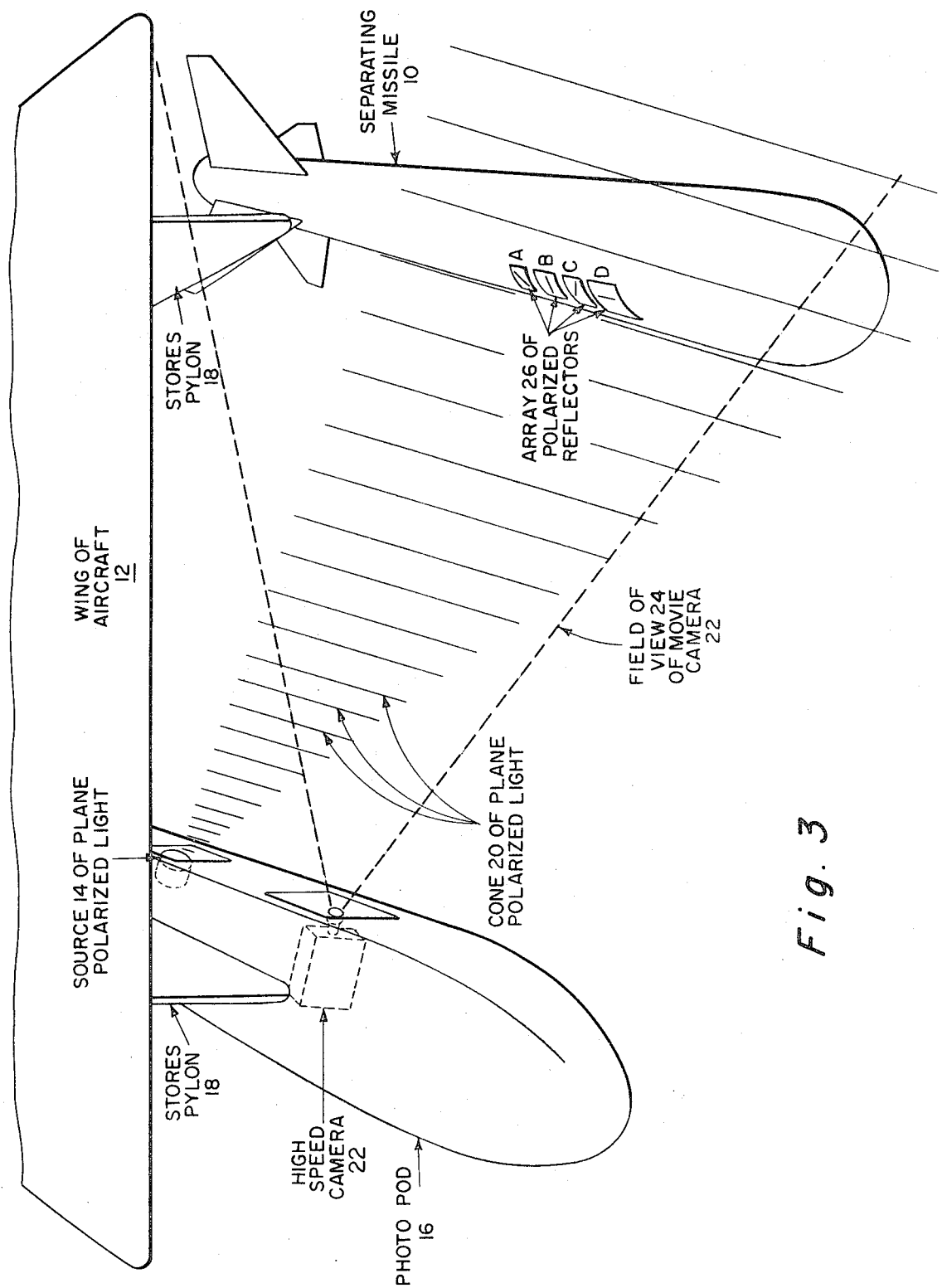
FIG. 3 is a schematic view of a system designed in accordance with the principles of the present invention and installed upon a missile-launching aircraft.

Before considering the manner in which the invention results are achieved, it will be helpful to recall that when plane-polarized light is reflected from a mirror, its major plane of vibration is rotated by an amount which is a function of both the angle of incidence and the relative orientation of the plane of vibration. A diffuse reflecting surface (which can be considered to be composed of many small randomly oriented mirror elements) will, by definition, scatter the incident beam in all directions. If the incident beam is polarized, the diffuse reflected beams will also have all possible planes of vibration. Thus, a diffuse reflecting surface illuminated by a beam of plane-polarized light will appear equally luminous to an observer positioned at any point from which the illuminated surface can be seen. Further, the emitted rays will have a uniformly random orientation of planes of polarization regardless of observer position.

If a polarizing filter (such as Polaroid) is now placed over the diffuse reflecting surface so that both the incident beam and all reflected beams must pass through it, the reflector will again appear equally luminous to an observer at any position (neglecting the factor of greater absorption at more oblique angles through the Polaroid film). However, the observed magnitude of surface luminosity will be a function of the angle between the polarization axis of the filter and the plane of vibration of the incident beam. Also, and of particular importance to this invention, is the fact that the condition of light extinction (when the plane of vibration of the incident beam is so rotated) is observable simultaneously at all positions from which the diffuse reflecting surface can be seen. This behavior is the basis for the hereinafter-disclosed techniques for instrumenting dynamic events, particularly the separation of missiles from aircraft.

TABLE OF SYMBOLS $\hat{A}$ = Intersection of plane of vibration and plane of mirror.
$\bar{E}_i$ = Direction of electric vector of the incident beam of plane-polarized light, (FIG. 1).
$\bar{E}_r$ = Direction of electric vector of the reflected beam of plane-polarized light, (FIG. 1).
$\bar{H}_i$ = Direction of magnetic vector of the incident beam of plane-polarized light, (FIG. 1).

$\hat{H}_r$ = Direction of magnetic vector of the reflected beam of plane-polarized light, (FIG. 1).

$\hat{\eta}_1$ = Unit normal to the plane of a source filter, (FIG. 4).

$\hat{\eta}_2$ = Unit normal to the plane of a reflector filter, (FIG. 4).

$\hat{\eta}_m$ = Unit normal to a flat mirror element, (FIG. 1).

$\hat{P}_1$ = Polarization direction of a source filter, (FIG. 2).

$\hat{P}_2$ = Polarization direction of a reflector filter, (FIG. 2).

$\hat{S}_i$ = Incident beam direction (direction of Poynting vector), and line-of-sight direction from source to reflector, (FIGS. 1, 2, and 4).

$\hat{S}_r$ = Reflected beam direction, (FIG. 1).

$\theta_1$ = Angle between $j$th and $k$th source filter polarization vectors, (FIG. 4).

$\theta_2$ = Angle between $j$th and $k$th reflector filter polarization vectors, (FIG. 4).

$\psi_1$ = Angle between normal to source filter plane and line-of-sight vector, $\hat{S}_i$, (FIG. 4).

$\psi_2$ = Angle between normal to reflector filter plane and line-of-sight vector, $\hat{S}_i$, (FIG. 4).

$\theta_1$ = Angle between a source filter polarization vector and the line-of-sight vector, $\hat{S}_i$, (FIG. 4).

$\theta_2$ = Angle between a reflector filter polarization vector and the line-of-sight vector, $\hat{S}_i$, (FIG. 4).

subscripts:

1 = source polarization filter.

2 = reflector polarization filter.

$i$ = incident.

$j, k$ = identification of different polarized beams; if beams are color coded, these would identify parameters associated with the $j$th and $k$th colors respectively.

$m$ = mirror element.

$r$ = reflected.

Note: All of the above vectors are of unit length only for the purpose of showing direction.

The essential elements of plane-polarized light reflecting from a mirror can, for the purposes of this invention, be represented by the vectors shown in FIG. 1 of the drawings. $\hat{\eta}_m$ is the normal to the mirror surface, $\hat{H}$ is the magnetic vector, $\hat{E}$ is the electric vector, and $\hat{S}$ is the Poynting vector (where $\hat{S} = \hat{E} \times \hat{H}$). (Note: In this discussion certain aspects of plane-polarized light reflection from metallic or dielectric surfaces have been neglected; the physical phenomena of the component of the electric vector parallel to the plane of incidence (described by vectors $\hat{S}$ and $\hat{\eta}_m$) experiencing a different phase shift and attenuation than the component perpendicular to the plane of incidence are not considered. From experimentation, it appears that the dominant electric vectors of the reflected light obey the above relationships. Therefore, while FIG. 1 of the drawings is physically over-simplified, it does allow development of formulae which are correct for the special cases of polarized light reflection to be set forth below. Subscript $i$ denotes vectors of the incident beam, while subscript $r$ denotes vectors of the reflected beam. The electric vector of an electromagnetic wave, which is responsible for optical phenomena, is used to determine the plane of vibration of polarized light in the development of the following formulas. Since the vector direction rather than magnitude is of primary importance, all vectors shown will be unit vectors. From FIG. 1, which represents the most general case of plane-polarized light reflection, it is seen that both $\hat{E}_i$ and $\hat{E}_r$ and $\hat{S}_i$ and $\hat{S}_r$ are symmetrical about $\hat{\eta}_m$ (while $\hat{H}_i$ and $\hat{H}_r$ are not). Therefore, the following relationships result:

$$\hat{E}_r = -\hat{E}_i + 2(\hat{E}_i \cdot \hat{\eta}_m)\hat{\eta}_m \quad (1)$$
$$\hat{S}_r = \hat{S}_i - 2(\hat{S}_i \cdot \hat{\eta}_m)\hat{\eta}_m \quad (2)$$

Placement of a polarized filter above the mirror so that its intercepts both the reflected and the incident ray will cause maximum or minumum attenuation of the final reflected ray depending upon its orientation relative to the mirror and the plane of vibration of the incident beam. If it is assumed that the direction of polarization of the filter, represented by $\hat{P}_2$. (subscript 2 for reflector, subscript 1 being used for light source), falls within the plane of vibration of the incident beam; then the following vector relationship defines the possible orientations of the unit normal of the plane of the filter $\hat{\eta}_2$, in order that $\hat{P}_2$ also falls within the plane of vibration of the reflected ray; i.e., maximum light is reflected from the filter-mirror combination:

$$(\hat{H}_i \cdot \hat{\eta}_m)(\hat{H}_i \cdot \hat{\eta}_2 \hat{\eta}_m) = 0 \quad (3)$$

If the first term, $\hat{H}_i \cdot \hat{\eta}_m$, is zero, then the special case arises in which the planes of vibration of both the incident and the reflected rays are the same and are normal to the plane of the mirror. In the most general case, the second term is zero:

$$(\hat{H}_i \cdot \hat{\eta}_2 \hat{\eta}_m) = 0 \quad (4)$$

From (4), if the filter plane is parallel to the mirror plane ($\hat{\eta}_2 \times \hat{\eta}_m = 0$), then any orientation of $\hat{H}_i$ is permissible. From (3), if $\hat{H}_i \cdot \hat{\eta}_m = 0$, then any orientation of the filter is permissible. In the most likely case, if $\hat{\eta}_2$ is not parallel to $\hat{\eta}_m$, then $\hat{H}_i$ must be perpendicular to the line formed by $\hat{\eta}_2 \times \hat{\eta}_m$. Geometrically, this means that the incident magnetic vector must be perpendicular to the line of intersection of the mirror and filter planes for maximum reflected light intensity. From (4), the electric, Poynting, and the two normal vectors must be related by:

$$(\hat{E}_i \cdot \hat{\eta}_2)(\hat{S}_i \cdot \hat{\eta}_m) = (\hat{S}_i \cdot \hat{\eta}_2)(\hat{E}_i \cdot \hat{\eta}_m) \quad (5)$$

Any rotation of the polarized filter about its normal by an angle $\alpha$ away from that orientation in which $\hat{P}_2$ lies within the plane of vibration of the incident ray will cause attenuation of the transmitted ray's intensity by the factor:

$$\text{Attenuation Factor} = \cos^2 \alpha \quad (6)$$

This is because the observed intensity of a light ray depends upon its power, which in turn varies as the square of the electric vector magnitude. The intensity of the reflected ray after retransmission through the filter is multiplied by the same attenuation factor, (6), whether or not the conditions of equation (4) are complied with. Noncompliance with equation (4) simply introduces an additional attenuation that is unrelated to $\alpha$. (Note: In tracing a ray from source, through the filter, reflecting off the mirror, and back through the filter, the intensity of the ray at any point for $\alpha=0$ is multiplied by the attenuation factor in (6) only once to obtain the effects of $\alpha$; (6) is the law of Malus.)

If the above mirror (or that shown in FIG. 1) is replaced by a diffuse reflecting surface consisting, by definition, of many randomly oriented mirror elements, each with its own $\hat{\eta}_m$, then from equations (1) and (2) random orientations of $\hat{E}_r$ and $\hat{S}_r$ will result from a single incident ray of polarized light having specific values of $\hat{E}_i$ and $\hat{S}_i$. If, further, a single polarized filter is placed over the diffuse reflector, as in FIGS. 6 and 7, then it is seen that many of the mirror elements of the reflector will comply with, or nearly comply with, the condition of maximum reflected ray intensity specified by equation (4). Thus, the diffuse reflector will appear illuminated from any view angle subject only to the limitations imposed by equation (6). Further, for a completely diffuse reflector, the randomness of $\hat{\eta}_m$ and hence of $\hat{E}_i$ and $\hat{S}_i$ is also complete, so the reflector appears equally illuminated regardless of view angle. The feature of being able to view from any angle (with camera or eye) the results of changes in the angle $\alpha$ of a filter-diffuse-reflector sandwich is of key importance in the present concept.

Two polarized filters can be arranged as shown in FIG. 2. $\hat{A}$ and $\hat{P}_2$ are unit vectors representing, respectively, the direction of the intersection line between filter plane and plane of vibration and the direction of filter polarization. Subscripts 1 and 2 refer, respectively, to the filter over the light source and the filter over the diffuse reflector. The two extremes of reflector illumination, maximum and minimum (or extinction), are shown with the associated relationships of $\hat{A}$ and $\hat{P}_2$. From the condition for extinction, the following must hold:

$$\hat{P}_1 \times \hat{S}_i \perp \hat{P}_2 \times \hat{S}_i \text{ or } (\hat{P}_1 \times \hat{S}_i) \cdot (\hat{P}_2 \times \hat{S}_i) = 0 \quad (7)$$

In FIG. 2, the direction of the ray from the source to the reflector can be represented by the Poynting vector of the incident polarized light, $\hat{S}_i$ since $(\hat{P}_1 \times \hat{S}_i)/\sin \theta_1$ is a unit normal to the plane of vibration as well as to $\hat{S}_i$, and since $(\hat{P}_2 \times \hat{S}_i)/\sin \theta_2$ is a unit vector normal to $\hat{S}_i$, then when extinction occurs, these two unit vectors are also perpendicular to each other and can then describe $\hat{S}_i$:

$$\frac{(\hat{P}_1 \times \hat{S}i) \times (\hat{P}_2 \times \hat{S}i)}{\sin \theta_1 \sin \theta_2} = \pm \hat{S}i \quad (8)$$

This, when developed, becomes:

$$\frac{(\hat{P}_1 \hat{S}i \hat{S}i)\hat{P}_2 - (\hat{P}_1 \hat{S}i \hat{P}_2)\hat{S}i}{\sin \theta_1 \sin \theta_2} = \pm \hat{S}i \quad (9)$$

Since $(\hat{P}_1 \hat{S}_i \hat{S}_i) = 0$, the condition of extinction at the reflector is given by:

$$(\hat{P}_1 \hat{S}_i \hat{P}_2) = \pm \sin \theta_1 \sin \theta_2 \quad (10)$$

where $\theta_1$ and $\theta_2$ are the angles between $\hat{S}_i$ and $\hat{P}_1$ and $\hat{P}_s$ respectively. The ± sign arises because polarization direction of a filter has no positive or negative sense; therefore equation (10) accommodates vectors of either sign in representing polarization.

Application of the Invention Concept to Determine the Attitude of a Missile Following Separation from an Aircraft In FIG. 3 of the drawings is shown a missile 10 immediately following its launch from an aircraft 12. A source 14 of plane-polarized light is carried on a pod 16 supported from the aircraft wing 12 by a pylon 18. Such source 14 may, for example, be a laser having both polarization and monochromaticity, but in any event incorporates a lens developing a cone of illumination 20 directed toward missile 10, as illustrated in the drawing.

A high-speed motion-picture camera 22 of standard design is also carried on pod 16, such camera having a field of view 24 encompassing the separating missile 10.

An array 26 of reflectors is attached to the surface or skin of missile 10. These reflectors are impinged by the light from source 14, and lie within the field of view 24 of camera 22. Each reflector of the array 26 may be in the form shown in FIG. 7 of the drawings, consisting of a polarizing filter 28 in front of a diffuse reflector 30, the assembly being bonded together into a thin flexible "package" that can be pasted, taped, or otherwise attached to the surface of missile 10. The polarization direction of each of the reflectors A, B, C, and D of array 26 in FIG. 3 is rotated a predetermined amount from the preceding member so that the full 360° rotation is evenly divided over the total number of reflectors (although four are shown, any number can be used). The angular relationship between the plane of polarization and the polarization of a particular reflector determines whether or not that reflector appears illuminated to the viewing camera 22. This condition of illumination as seen by the camera 22 is independent of the camera's angular relationship to the reflector, as long as it can "see" any of the reflector's surface. The pattern of illumination or darkness in the array 26 of progressively arranged polarized reflectors then indicates the angular relationship between the plane of polarization of illuminating light and the missile on which the array is mounted.

The camera 22 thus views the array 26 of polarized-filter diffuse-reflector "sandwiches" affixed to the skin of missile 10, and which are in turn illuminated with polarized light from source 14. The polarization direction of each reflector A, B, C, and D of the array 26 (shown by a double-headed arrow in FIG. 3) is, as above stated, rotated relative to the preceding reflector, so that a full revolution is divided into a number of equal divisions. As the missile 10 rotates (in the example shown the primary rotation would be about the pitching axis) relative to the plane of vibration of the polarized light, successive reflectors will show extinction according to equations (7) or (10). Since the plane of vibration of the polarized light is fixed relative to the aircraft, and since the condition of reflector extinction (as well as the observability of the extinction) is independent of pure translation of the missile (as long as equations (7) and (10) are complied with), then angular information as to missile attitude is available. If, as often happens with conventional arrangements, only one camera station has an oblique view of a missile, then true pitch or yaw attitude relative to the launching aircraft is very uncertain from this source alone. Noting which of reflectors A, B, C, and D extinguishes, and knowing the orientation of the plane of vibration of the polarized light 20 within the aircraft coordinate system will reduce this uncertainty.

Should the light source 14 be a laser which emits polarized light directly, rather than a conventional noncoherent source behind a filter, the above equations are still valid, with $\hat{P}_1$ becoming identical with $\hat{E}_i$.

Figure 7:
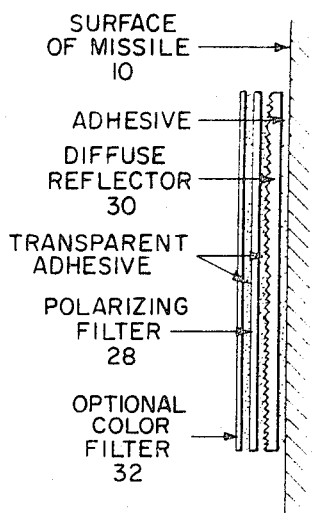
FIG. 7 is a sectional view of one of the reflectors of FIG. 6 as attached to such object.

While the system shown in FIG. 3 increases the overall data accuracy for relatively simply missile trajectories where rotation is about one axis only, anomalies in angular data can arise if the missile experiences combinations of roll, pitch, and yaw. For this situation, two polarized light beams with nonparallel planes of vibration may be used. These two beams are color coded by placing color filters 32 over both source and reflector polarized filters, as shown in FIG. 7. The analysis below demonstrates the validity of this multibeam method.

The two polarized light beams (whose planes of vibration are not parallel) are color coded with colors $j$ and $k$. It is assumed that the two sources and the two sets of reflectors are so close together that, for analytical purposes, they share a common line of sight represented by $\hat{S}_i$. The unit vectors for this situation are shown in FIG. 4. For each colored beam, the same development as used for equations (7) and (10) gives, for extinction:

$$\hat{P}_{1_j} \times \hat{S}_i \perp \hat{P}_{2_j} \times \hat{S}_i, \quad \hat{P}_{1_k} \times \hat{S}_i \perp \hat{P}_{2_k} \times \hat{S}_i \quad (11) \text{ and}$$

$$(\hat{P}_{1_j} \hat{S}_i \hat{P}_{2_j}) = \pm \sin \theta_{1_j} \sin \theta_{2_j}$$

$$(\hat{P}_{1_k} \hat{S}_i \hat{P}_{2_k}) = \pm \sin \theta_{1_k} \sin \theta_{2_k} \quad (12)$$

Since, as shown in FIG. 4, the $j$ and $k$ source filters are assumed at one point, and the $j$ and $k$ reflector filters are assumed at another point, so that $\hat{S}_i$ is common to both polarized rays; then the angle between $j$ and $k$ planes of vibration is constant along the line of sight between source point and reflector point. Another way of representing this is to state that the angle between the unit normals to the planes of vibration at the source point, $(\hat{P}_{1_j} \times \hat{S}_i)/\sin \theta_{1_j}$ and $(\hat{P}_{1_k} \times \hat{S}_i)/\sin \theta_{1_k}$, is equal to the angle between the unit normals to $\hat{S}_i$ at the reflector point, $(\hat{P}_{2_j} \times \hat{S}_i)/\sin \theta_{2_j}$ and $(\hat{P}_{2_k} \times \hat{S}_i)/\sin \theta_{2_k}$. (Note: Where $\hat{P}_{2_j}$ and $\hat{P}_{2_k}$ are for those reflectors observed to experience extinction.) Thus:

$$\frac{(\hat{P}_{1_j} \times \hat{S}i)}{\sin \theta_{1_j}} \cdot \frac{(\hat{P}_{1_k} \times \hat{S}i)}{\sin \theta_{1_k}} = \pm \frac{(\hat{P}_{2_j} \times \hat{S}i)}{\sin \theta_{2_j}} \cdot \frac{(\hat{P}_{2_k} \times \hat{S}i)}{\sin \theta_{2_k}} \quad (13)$$

Equation 13 then becomes:

$$\frac{(\hat{P}_{1_j} \hat{P}_{1_k}) - (\hat{S}i \cdot \hat{P}_{1_j})(\hat{S}i \cdot \hat{P}_{1_k})}{\sin \theta_{1_j} \cdot \sin \theta_{1_k}}$$

$$= \pm \frac{\hat{P}_{2_j} \hat{P}_{2_k} - (\hat{S}i \cdot \hat{P}_{2_j}) \hat{S}i \cdot \hat{P}_{2_k})}{\sin \theta_{2_j} \cdot \sin \theta_{2_k}} \quad (14)$$

or, since the dot products of unit vectors give the cosines of the angles between them:

$$\frac{\cos \phi_1 - \cos \theta_{1_j} \cdot \cos \theta_{1_k}}{\sin \theta_{1_j} \cdot \sin \theta_{1_k}} = \pm \frac{\cos \phi_2 - \cos \theta_{2_j} \cos \theta_{2_k}}{\sin \theta_{2_j} \cdot \sin \theta_{2_k}} \quad (15)$$

$\phi_1$ is the angle between the polarization vectors of the two source filters, $\hat{P}_{1_j}$ and $\hat{P}_{1_k}$. $\phi_2$ is the angle between the polarization vectors of the two reflector filters that are experiencing extinction, $\hat{P}_{2_j}$ and $\hat{P}_{2_k}$. The angles $\phi_1$ and $\phi_2$ are known when the source filters are installed on the aircraft and the reflector arrays (for colors $j$ and $k$) are affixed to the surface of the missile to be launched. A ground optical calibration may be made before flight to measure all angles.

The unknown angles in equation (15) are $\theta_{2_j}$ and $\theta_{2_k}$. These two angles are used to relate the polarization vectors of the extinguished reflectors, $\hat{P}_{2_j}$ and $\hat{P}_{2_k}$, to the line of sight represented by $\hat{S}_i$. Since, from ground calibration, $\hat{P}_{2_j}$ and $\hat{P}_{2_k}$ are known relative to the body axis system of the missile, then $\theta_{2_j}$ and $\theta_{2_k}$ will indicate the orientation of the missile to the line of sight. However, since there are two unknowns, an additional equation besides (15) is needed. To obtain the additional equation, the condition of equal angles between normal unit vector pairs at source and reflector points is stated in a manner similar to that in equation (13):

$$\frac{(\hat{P}_{1_j} \times \hat{S}i) \times (\hat{P}_{1_k} \times \hat{S}i)}{\sin \theta_{1_j} \sin \theta_{1_k}} = \pm \frac{(\hat{P}_{2_j} \times \hat{S}i) \times (\hat{P}_{2_k} \times \hat{S}i)}{\sin \theta_{2_j} \sin \theta_{2_k}} \quad (16)$$

Expanding (16):

$$\frac{(\hat{P}_{1_j} \hat{P}_{1_k} \hat{S}i) \hat{S}i - (\hat{P}_{1_k} \hat{S}i \hat{S}i) \hat{P}_{1_j}}{\sin \theta_{ij} \sin \theta_{ik}}$$

$$= \pm \frac{(\hat{P}_{2_j} \hat{P}_{2_k} \hat{S}i) \hat{S}i - (\hat{P}_{2_k} \hat{S}i \hat{S}i) \hat{P}_{2_j}}{\sin \theta_{2_j} \sin \theta_{2_k}} \quad (17)$$

Because $\hat{P}_{1_k} \hat{S}i\hat{S}i) = 0$ and $(\hat{P}_{2_k} \hat{S}i\hat{S}i) = 0$, (17) becomes:

$$\frac{(\hat{P}_{1_j} \hat{P}_{1_k} \hat{S}i)}{\sin \theta_{1_j} \sin \theta_{1_t}} = \pm \frac{(\hat{P}_{2_k} \hat{P}_{2_j} \hat{S}i)}{\sin \theta_{2_j} \sin \theta_{2_k}} \quad (18)$$

Fig. 4 shows two unit normal vectors which are defined as:

$$\hat{\eta}_1 = \frac{\hat{P}_{1_j} \times \hat{P}_{1_k}}{\sin \phi_1}, \quad \hat{\eta}_2 = \frac{\hat{P}_{2_j} \times \hat{P}_{2_k}}{\sin \phi_2} \quad (19)$$

The angles between these unit normal vectors and the line of sight are given by:

$$\cos \psi_1 = \hat{\eta}_1 \cdot \hat{S}_i, \quad \cos \psi_2 = \hat{\eta}_2 \cdot \hat{S}_i \quad (20)$$

Substituting (19) and (20) into (18):

$$\frac{\sin \phi_1 \cos \psi_1}{\sin \theta_{1_j} \sin \theta_{1_k}} = \frac{\sin \phi_2 \cos \psi_2}{\sin \theta_{2_j} \sin \theta_{2_k}} \quad (21)$$

there is now a second equation relating the unknown angles $\theta_{2_j}$ and $\theta_{2_k}$. However, two more angles have been introduced, $\psi_1$ and $\psi_2$. At the time of optical calibration, the two unit normal vectors $\hat{\eta}_1$ and $\hat{\eta}_2$, are known relative to the aircraft and missile coordinate systems respectively. From conventional photo reduction techniques (i.e., not using any information available from the polarized light phenomena), $\hat{S}_i$ can be determined in the aircraft coordinate system by tracking the position in the camera field of view of the reflector point. Thus, from (20), $\psi_1$ can be determined for each moment in time. (Note: A position vector in the aircraft coordinate system relating the camera to the polarized light source point is determined during preflight optical and calibration.) $\psi_2$, the final unknown, is determined by trigonometry (see the lower portion of FIG. 4):

$$\sin \psi_2 = \pm \frac{1}{\sin \phi_2} \sqrt{\cos^2 \theta_{2_k} - 2 \cos \theta_{2_j} \cos \theta_{2_t} \cos \phi_2 + \cos^2 \theta_{2_j} \cos \phi_2 + \cos^2 \theta_{2_j} \sin \phi_2} \quad (22)$$

The Clock Applique — Placing Time Marks on a Separating Missile for Time Synchronization of Viewing Cameras The task of photo-instrumentation of missiles separating from aircraft is often made more difficult because of uncertain time calibration of events on the film. This is because movie frame rates can vary from their preflight measured values due to such environmental factors as temperature changes (especially units mounted in the free stream) and shock and vibration (often caused by the launching impulse). A known expedient has been to impress a time mark on each film border from a precision time signal generator on the aircraft or received by radio (such as range time). However, this requires extra wires on the aircraft and more sophisticated movie cameras. Even then, the time signal is occasionally lost by one or more cameras.

One solution to the above problems is an application of polarized light in a manner similar to that described above to obtain missile attitude information. If, in FIG. 3, the plane of vibration is made to rotate about the optical center line of the polarized light source 14, then the reflectors A, B, C, and D will experience extinction in cyclical succession. This action recorded on the film of camera 22 will provide the film viewer with a stepwise or digital "clock" independent of the camera frame rate. Assuming the rotation rate of the plane of vibration is at a constant predetermined value, the accuracy of this clock depends upon the number of pasted-on reflectors 26 and the ratio of vibration plane rotation to missile pitch or yaw rate. The higher the vibration plane rotation rate (while not approaching the movie frame rate) the less error the missile rotation rate will introduce. However, if the rotation rate of the plane of vibration is high, a time anomaly might occur in that there could be an uncertainty between the time references of two or more cameras of one or more revolutions. For the above reason, several polarized beams of different colors are rotated at different rates and in opposite directions for greater precision and to eliminate the time anomaly with the slowest rotating beam in the same manner as the hour hand does on a conventional clock.

Figure 6:
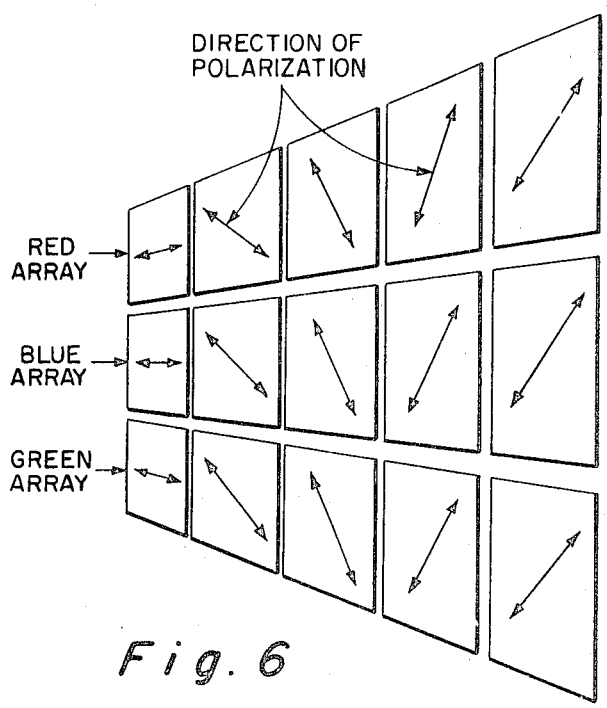
FIG. 6 is one arrangement of reflectors to be carried on the surface of the object the kinematics of which are to be ascertained.
Figure 5:
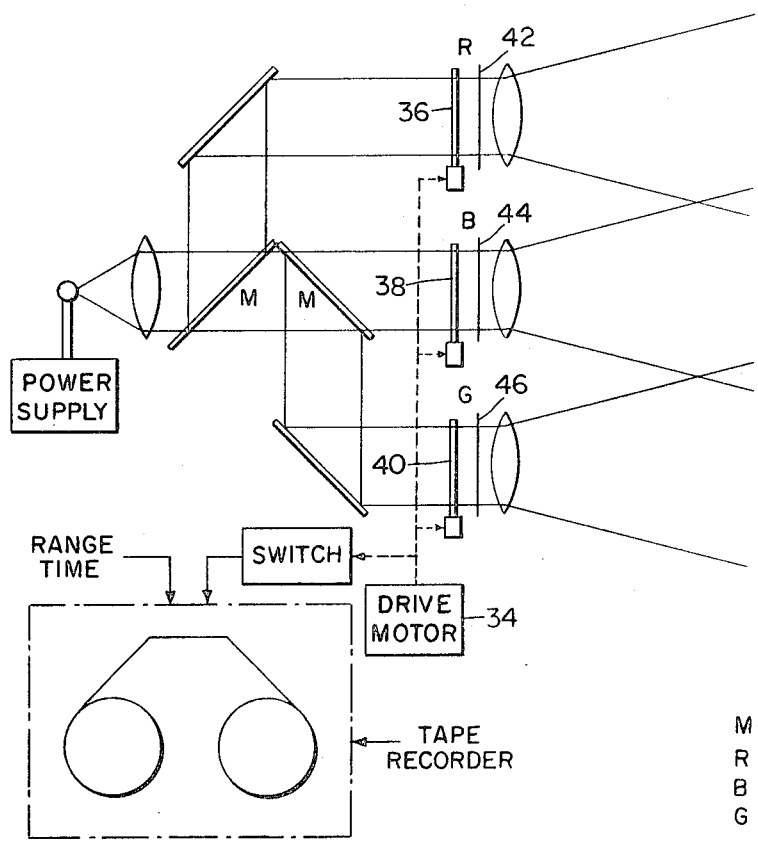
FIG. 5 is a schematic diagram of a preferred system for generating three colored rotating beams of plane-polarized light used in one embodiment of the invention.

The system shown in FIG. 5 of the drawings generates such multiple beams of polarized light. All rotation rates and phase angles, as well as reference time marks for comparison with range time and synchronization of a strobe light source (optional, if high intensity is needed), are controlled by a single precision drive motor 34. FIG. 6 shows the reflector arrays which may be used in the system shown in FIG. 5. In principle, these reflector arrays are the same as those used in FIG. 3 for attitude determination.

As shown in FIG. 5, the plane of polarization of the illuminating beam can be made to rotate by mechanically rotating the polarizers 36, 38, and 40. The reflectors constituting the red, blue, and green arrays of FIG. 6 then illuminate or darken in a cyclic pattern of the same frequency as that of the effective rotation of the source filters 42, 44, and 46. This serves to establish a "clock" on the missile (hence the term "clock applique"). This "clock" functions as an optical time base regardless of missile attitude or flow field as long as the reflectors of FIG. 6 can be seen by the camera and are impinged by light from the system of FIG. 5.

To achieve a "vernier" effect, the polarizers 36, 38, and 40 can rotate at different speeds to simulate the hour, minute, and second hands of a clock. The rotation of these polarizers should be at a speed high enough so that the movement of the missile 10 introduces a negligible error into the derived data.

The data derived and recorded on the film of camera 22, as well as on the respective films of additional cameras if such are used, is time-correlated by well-known techniques.

Although the preceding description has been directed to the use of polarized light in obtaining kinematic data concerning missile separation from aircraft, similar techniques can be used in a wide range of dynamic testing where conventional photoinstrumentation is presently employed. Digital computers are ideally suited to converting the polarized light data into a missile attitude history in any desired coordinate system. In addition to the equations with which computers are presently programmed in order to convert moving-picture data into trajectory data, additional programming to allow use of polarized-light data is possible by utilizing many of the equations hereinabove developed.

Application of the polarized-light concepts described herein requires consideration of the following to obtain maximum data precision:

a. The number of progressive reflectors in an array determines the angular difference between successive polarization directions and hence the angular resolving power of the array.

b. The polarized light source must be of high enough intensity to overcome both light absorption in various filters and background illumination in order that the contrast between an illuminated and an extinguished reflector register on moving picture film. A strobe light or high-power laser may provide sufficient intensity provided the light pulse repetition rate equals that of the fastest moving picture frame rate used (for missile separation studies this is normally up to 500 frames per second).

c. It is desirable that the surface on which a reflector is glued be as flat as possible, since curvature would introduce an uncertainty as to whether or not a reflector had reached maximum extinction.

d. Operators of film viewers will identify which reflectors experience extinction in each movie frame. Because of the above problems (i.e., a finite number of reflectors in each array, washout of contrast due to absorption and background lighting, and some surface curvature), it will be up to the operator's judgement as to when a particular array reaches maximum extinction. This can be aided by interpolation between neighboring reflectors and over a sequence of several frames. It is possible to increase the angular sensitivity of each reflector over that of a single polarized filter (as given by the law of Malus) by placing a second filter over the first with its polarization direction at a small angle to that of the first one. Also, multiplicity of reflector arrays and polarized beams will allow greater interpolation plus RMS averaging of several readings to lessen any human error in judgement.

Obviously many modifications and variations of the present invention are possible in the light of the above teachings. It is therefore to be understood that within the scope of the appended claims the invention may be practiced otherwise than as specifically described.

I claim:

1. Apparatus for ascertaining the positional characteristics of an object undergoing motion with respect to a given viewing location, said apparatus comprising:
   a source of plane-polarized light at said viewing location, the light from said source being directed toward said object to illuminate the latter;
   a plurality of polarized reflectors carried by said object, the polarization direction of each reflector of said plurality being rotated a given amount with respect to the remaining reflectors, and with the total polarization angle covered by all of said reflectors equaling substantially 360°; and
   at least one light pickup means at said viewing location, said pickup means being arranged to intercept light returned by each reflector of said plurality and to make a permanent record of changes in the respective amounts thereof as said object undergoes motion with respect to said viewing location.

2. The apparatus of claim 1 in which said light source is a laser.

3. The apparatus of claim 1 in which said light pickup means is a motion-picture camera.

4. The apparatus of claim 1 in which each reflector of said plurality includes a polarizing filter and a planar diffusing member arranged in closely spaced parallel relationship.

5. The apparatus of claim 1 in which said viewing location is an aircraft and said object is a missile launched therefrom.

6. The apparatus of claim 1 in which said light source is arranged to develop separate beams of light having different chromatic characteristics, and in which said plurality of polarized reflectors are arranged in groups with the reflectors of each group being responsive only to the impingement thereon of light having one of such chromatic characteristics.

7. The apparatus of claim 6 in which the chromatic characteristics of said light beams are those of the three primary colors.

8. The combination of claim 7 in which the plane of polarization of each of the separate beams of light developed by said source is caused to rotate in cyclic fashion.

9. The combination of claim 8 in which the cyclic rotation of each of the said separate beams of light is at a speed different from that of the remaining beams.